(12) United States Patent
Robinson et al.

(10) Patent No.: US 8,121,439 B2
(45) Date of Patent: Feb. 21, 2012

(54) END-TO-END DESIGN OF ELECTRO-OPTIC IMAGING SYSTEMS USING THE NONEQUIDISTANT DISCRETE FOURIER TRANSFORM

(75) Inventors: M. Dirk Robinson, Menlo Park, CA (US); Kathrin Berkner, Los Altos, CA (US)

(73) Assignee: Ricoh Co., Ltd., Tokyo (JP)

( * ) Notice: Subject to any disclaimer, the term of this patent is extended or adjusted under 35 U.S.C. 154(b) by 321 days.

(21) Appl. No.: 12/471,296

(22) Filed: May 22, 2009

(65) Prior Publication Data

US 2010/0299113 A1 Nov. 25, 2010

(51) Int. Cl.
G06K 9/20 (2006.01)
G06K 9/40 (2006.01)
H04N 5/225 (2006.01)

(52) U.S. Cl. ............ 382/312; 382/254; 348/335
(58) Field of Classification Search ........... 382/254, 382/260, 274, 295, 305, 312, 317, 321; 348/207.99, 348/335; 375/240.99, 240.29; 359/328; 703/2, 13
See application file for complete search history.

(56) References Cited

U.S. PATENT DOCUMENTS

| | | | |
|---|---|---|---|
| 5,227,890 A | 7/1993 | Dowski, Jr. | |
| 5,412,200 A * | 5/1995 | Rhoads | 250/201.9 |
| 5,521,695 A | 5/1996 | Cathey, Jr. et al. | |
| 5,680,588 A * | 10/1997 | Gortych et al. | 430/30 |
| 5,715,483 A | 2/1998 | Omata et al. | |
| 5,748,371 A | 5/1998 | Cathey, Jr. et al. | |
| 5,870,179 A | 2/1999 | Cathey, Jr. et al. | |
| 6,021,005 A | 2/2000 | Cathey, Jr. et al. | |
| 6,069,738 A | 5/2000 | Cathey, Jr. et al. | |
| 6,418,243 B1 * | 7/2002 | Skoglund et al. | 382/274 |
| 6,437,925 B1 | 8/2002 | Nishioka | |
| 6,449,387 B1 * | 9/2002 | Inui | 382/144 |
| 6,525,302 B2 | 2/2003 | Dowski, Jr. et al. | |
| 6,809,995 B2 | 10/2004 | Kadlec et al. | |
| 6,842,297 B2 | 1/2005 | Dowski, Jr. | |
| 6,873,733 B2 | 3/2005 | Dowski, Jr. | |
| 6,891,781 B2 | 5/2005 | Kadlec et al. | |
| 6,911,638 B2 | 6/2005 | Dowski, Jr. et al. | |
| 6,940,649 B2 | 9/2005 | Dowski, Jr. | |
| 7,031,054 B2 | 4/2006 | Cathey, Jr. et al. | |
| 7,106,510 B2 | 9/2006 | Dowski, Jr. | |

(Continued)

FOREIGN PATENT DOCUMENTS

EP 0814605 A2 12/1997

(Continued)

OTHER PUBLICATIONS

Beylkin, G. et al., On Generalized Gaussian Quadratures for Exponentials and Their Applications, Applied and Computational Harmonic Analysis, 2002, pp. 332-373, vol. 12.

(Continued)

*Primary Examiner* — Kanjibhai Patel
(74) *Attorney, Agent, or Firm* — Fenwick & West LLP

(57) ABSTRACT

A unified design strategy takes into account different subsystems within an overall electro-optic imaging system. In one implementation, the design methodology predicts end-to-end imaging performance using a spatial model for the source and models for the optical subsystem, the detector subsystem and the digital image processing subsystem. The optical subsystem and digital image processing subsystems are jointly designed taking into account the entire system. Unconventional techniques such as the nonequidistant DFT (nDFT) are used to accelerate the design process.

20 Claims, 9 Drawing Sheets

U.S. PATENT DOCUMENTS

| | | | |
|---|---|---|---|
| 7,115,849 B2 | 10/2006 | Dowski, Jr. et al. | |
| 7,218,448 B1 | 5/2007 | Cathey, Jr. et al. | |
| 7,260,251 B2 | 8/2007 | Dowski, Jr. et al. | |
| 7,360,894 B2 * | 4/2008 | Hirohara | 351/205 |
| 7,379,613 B2 | 5/2008 | Dowski, Jr. et al. | |
| 7,596,776 B2 * | 9/2009 | Tanaka et al. | 716/56 |
| 7,602,501 B2 * | 10/2009 | Ralston et al. | 356/497 |
| 7,859,769 B2 * | 12/2010 | Zalevsky | 359/738 |
| 7,876,417 B2 * | 1/2011 | Dowski et al. | 355/18 |
| 7,889,264 B2 * | 2/2011 | Robinson | 348/342 |
| 7,924,341 B2 * | 4/2011 | Robinson | 348/335 |
| 2002/0118457 A1 | 8/2002 | Dowski, Jr. | |
| 2002/0195548 A1 | 12/2002 | Dowski, Jr. et al. | |
| 2003/0057353 A1 | 3/2003 | Dowski, Jr. et al. | |
| 2003/0169944 A1 | 9/2003 | Dowski, Jr. et al. | |
| 2003/0173502 A1 | 9/2003 | Dowski, Jr. et al. | |
| 2004/0145808 A1 | 7/2004 | Cathey, Jr. et al. | |
| 2004/0190762 A1 | 9/2004 | Dowski, Jr. et al. | |
| 2004/0228005 A1 | 11/2004 | Dowski, Jr. | |
| 2004/0257543 A1 | 12/2004 | Dowski, Jr. et al. | |
| 2005/0088745 A1 | 4/2005 | Cathey, Jr. et al. | |
| 2005/0117114 A1 | 6/2005 | Jiang | |
| 2005/0197809 A1 | 9/2005 | Dowski, Jr. et al. | |
| 2005/0264886 A1 | 12/2005 | Dowski, Jr. | |

FOREIGN PATENT DOCUMENTS

| | | |
|---|---|---|
| EP | 0998124 A2 | 5/2000 |
| WO | WO 2004/063989 A2 | 7/2004 |
| WO | WO 2005/062196 | 7/2005 |

OTHER PUBLICATIONS

Cathey, W. Thomas and Edward R. Dowski, "New paradigm for imaging systems," *Applied Optics*, vol. 41, No. 29, Oct. 10, 2002, pp. 6080-6092.

European Search Report, EP06253130, Sep. 26, 2005, 7 pages.

Fales, C.L. et al., "Imaging System Design for Improved Information Capacity," Applied Optics, Mar. 15, 1984, pp. 872-888, vol. 23, No. 6.

Fenn, M. et al., "On the Computation of the Polar FFT," Applied and Computational Harmonic Analysis, 2007, pp. 257-263, vol. 22.

Keiner, J. et al., "NFFT 3.0—Tutorial," 2002, [Online] [Retrieved on May 29, 2009] Retrieved from the Internet<URL:http://www-user.tu-chemnitz.de/~potts/nfft/doc.php>.

Maeda, Peter Y., Peter B. Catrysse, and Brain A. Wandell, "Integrating lens design with digital camera simulation," 5678 *SPIE Proceedings SPIE Electronic Imaging*, San Jose, CA, Feb. 2005, pp. 48-58.

MIT, "fftw-3.2 software," 2008, [Online] [Retrieved on May 29, 2009] Retrieved from the Internet<URL:http://www.fftw.org/>.

Potts, D. et al., "Fast Fourier Transforms for Nonequispaced Data: A Tutorial," Modern Sampling Theory: Mathematics and Applications, 2001, pp. 249-274.

U.S. Appl. No. 60/481,771, filed Dec. 11, 2003, Entitled "Method and Apparatus for Efficient Data Acquisition and Interpolation."

Forbes, G.W., "Optical System Assessment for Design: Numerical Ray Tracing in the Gaussian Pupil," J. Opt. Soc. Am., Nov. 1988, pp. 1943-1956, vol. 5, No. 11.

Hopkins, H.H. et al., "The Computation of Diffraction Patterns in the Presence of Aberrations," Journal of Modern Optics, Optica Acta, Mar. 1, 1970, pp. 157-182, vol. 17, No. 3.

"nfft-3.1.0 software," University of Chemnitz, Mar. 17, 2009, [Online] Retrieved from the Internet <URL:http://www-user.tu-chemnitz.de/~potts/nfft/download.php>.

Press, W. et al., "Numerical Recipes," Cambridge University Press, 2007, pp. 179-182.

Sheats, J.R. et al., "Microlithography Science and Technology," CRC Press, 1998, pp. 223-226.

Yzuel, M.J. et al., "A Study on the Computation Accuracy of the Aberrational Diffraction Images," Optica Acta, 1980, pp. 549-562, vol. 27, No. 4.

\* cited by examiner

END-TO-END DESIGN OF ELECTRO-OPTIC IMAGING SYSTEMS USING THE NONEQUIDISTANT DISCRETE FOURIER TRANSFORM

BACKGROUND OF THE INVENTION

1. Field of the Invention

This invention relates generally to the design of electro-optic imaging systems, and more particularly, to the "end-to-end" design of these systems using nonequidistant discrete Fourier transforms, including for example the nonequidistant fast Fourier transform.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). Traditional methods for designing these systems generally involve two discrete stages. First, the optical subsystem is designed with the goal of forming a high quality intermediate optical image of the source (subject to cost, physical and other non-imaging constraints). Next, after the optical subsystem has been designed, the digital image processing subsystem is designed to compensate for remaining defects in the sampled intermediate optical image.

The two design stages typically occur with very little coordination between the optical designer and the image processing designer. One drawback to the traditional design approach is that synergies between the optical subsystem and the digital image processing subsystem may be overlooked. There may be unwanted interactions between the two independently designed subsystems and potential synergies between the two subsystems may go unrealized.

Recently, more holistic design approaches have been proposed. For example, see U.S. patent application Ser. No. 11/155,870, "End-to-End Design of Electro-Optic Imaging Systems," which is incorporated by reference herein. These design processes combine traditional optical design with digital imaging processing, including characteristics of the imaging sensor. This provides a framework for the end-to-end design of a complete electro-optic imaging system.

The design process typically includes an optimization step that jointly optimizes parameters for the optical subsystem, the detector subsystem and/or the digital image processing subsystem. At each iteration of the optimization, the overall performance of the electro-optic imaging system is modeled, including propagation through each of the subsystems. This modeling is used to calculate a performance metric. The performance metric is optimized with respect to the design parameters. However, modeling propagation through each of the subsystems can be computationally time-consuming, which in turn results in a slow optimization and long design cycle.

Thus, there is a need for faster design techniques based on an end-to-end design of the electro-optic imaging system.

SUMMARY OF THE INVENTION

The present invention overcomes the limitations of the prior art by accelerating the end-to-end design of electro-optic imaging systems, for example by allowing more flexibility in the choice of sampling grids which can then be better suited to the tasks at hand. Examples include using sampling grids that are not regular rectangular grids, using the nonequidistant DFT (nDFT), including the nonequidistant FFT (nFFT), and/or using better suited quadrature approaches for numerical integration.

One aspect of the invention is a method for designing an electro-optic imaging system for imaging a source. The electro-optic imaging system includes an optical subsystem, a detector subsystem and a digital image processing subsystem. Propagation of the source through the optical subsystem, the detector subsystem and the digital image processing subsystem is modeled based on a spatial model of the source. This modeling includes calculating a pupil function for the optical subsystem, where the pupil function is sampled on a non-rectangular grid. A post-processing performance metric is calculated, which is a function of the modeled propagation. The performance metric accounts for a contrast capability of the optical subsystem and for noise from the detector subsystem and/or the digital image processing subsystem. The optical subsystem and the digital image processing subsystem are jointly designed based directly on the post-processing performance metric.

In another aspect, the modeling includes tracing rays through the optical subsystem, where the rays sample a pupil of the optical subsystem on a non-rectangular grid, even though they may eventually be interpolated to a rectangular grid for later computation. Examples of non-rectangular grids include polar grids and linogram grids. For certain situations, tracing 250 or fewer rays is sufficient to estimate a wavefront error function with an accuracy of better than $\lambda/10$.

Later computations may include nDFTs. For example, the ray trace may be used to calculate a pupil function. An nDFT may then be applied to the pupil function G to calculate a complex-amplitude point spread function U. An nDFT may also be applied to the corresponding intensity point spread function PSF to calculate an optical transfer function OTF. The OTF can then be used to calculate the integrand of the post-processing performance metric. The integral may be approximated using a quadrature-type numerical integration. In one approach, the post-processing performance metric is a Wiener filter-based mean square error (MSE). The features described above may be used together or separately.

In another aspect, the design process is performed iteratively and the accuracy of the modeling may be adjusted for different interations. For example, earlier iterations may have lower accuracy in order to achieve faster iterations. As a design solution is converged upon, the iterations may be adjusted to have higher accuracy. In some aspects, the user may control the adjustment. In other aspects, the adjustment may occur automatically.

Other aspects of the invention include software and tools to implement the design methods described above, and devices, systems and subsystems created by this design approach.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Introduction

Figure 1:
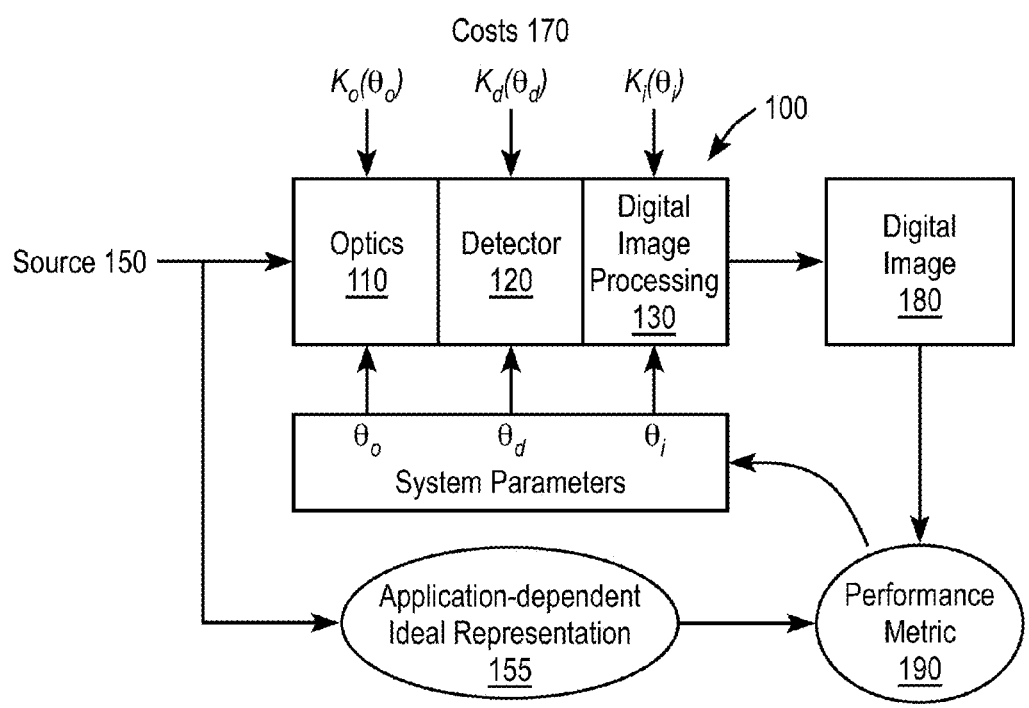
FIG. 1 is a block diagram illustrating the problem of designing an electro-optic imaging system.

FIG. 1 is a block diagram illustrating the problem of designing an electro-optic imaging system 100. The imaging system 100 includes an optical subsystem 110, detector subsystem 120 and digital image processing subsystem 130. The imaging system 100 is intended to image a source 150 and produces digital image 180. The general design problem is to design the imaging system 100 to "optimize" its overall performance, subject to certain constraints. In many cases, the goal of optimization is to produce a digital image 180 which matches the application-specific idealized version 155 of the input source.

Figure 2:
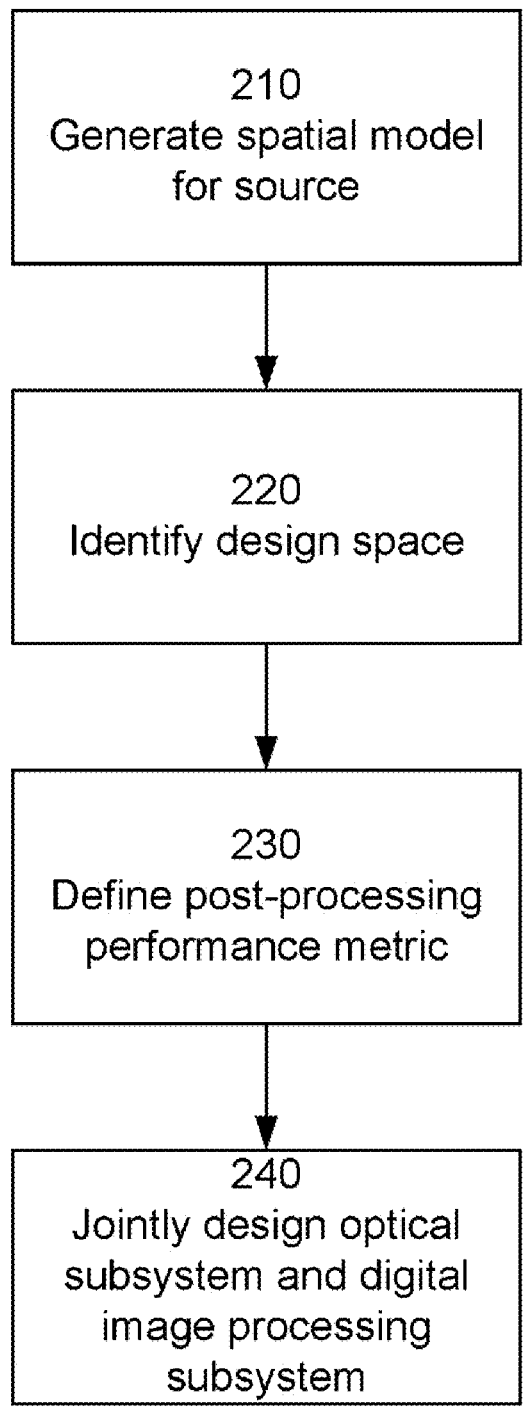
FIG. 2 is a flow diagram illustrating a method for designing an electro-optic imaging system according to the present invention.

FIGS. 1 and 2 illustrate an example method for designing an electro-optic imaging system 100 according to the present invention. Referring to FIG. 2, the design method includes generating 210 a spatial model of the source 150. The spatial model of the source may be derived for a specific situation, empirically measured, based on previously developed models or otherwise provided. Illumination, radiometry and geometry are factors that may be reflected in the source model. The spatial model preferably includes a statistical model of the source. Further examples will be described below.

The design space for the electro-optic imaging system is also defined 220. In FIG. 1, each of the subsystems is defined by its parameters $\theta_o$, $\theta_d$ and $\theta_i$, respectively. For example, the design space for the optical subsystem 110, described by the vector $\theta_o$, may be defined by number, type and size of lenses, radii of curvature, stops, etc. The design space for the detector subsystem 120, described by the vector $\theta_d$, may parameterize the number of pixels, detector spacing, fill factor, bandwidth, pixel geometry, etc. The design space for the digital image processing subsystem 130, described by the vector $\theta_i$, may identify the type(s) of digital image processing to be applied and parameters for that type of processing (e.g., linear or nonlinear filters, number of taps, tap weights, etc). Various non-imaging constraints or costs 170 associated with the designs may also be defined. The size of the design space of each subsystem will vary depending on the application. In some cases, there may be much latitude in designing a subsystem. In other cases, the design of the subsystem may be tightly constrained or even pre-defined (e.g., if the detector array is selected a priori).

A post-processing performance metric 190 is also defined 230. The performance metric is post-processing in the sense that it is based on performance after image processing rather than before image processing. For examples, measures of the wavefront error or spot size of the intermediate optical image produced by the optical subsystem alone may be conventional error metrics for the optical subsystem but they are not post-processing performance metrics. In FIG. 1, the post-processing performance metric 190 is based on a comparison of the digital image 180 produced by the imaging system 100 compared to the ideal digital image 155. In many design situations, the image 180 produced by the system is calculated by modeling propagation of the source characteristics 150 through the subsystems 110, 120 and 130 based on the spatial model of the source.

The design step 240 can be described as selecting a design within the design space that optimizes the post-processing performance metric 190, possibly subject to certain constraints (e.g., limits on certain costs 170). The optical subsystem 110 and the digital image processing subsystem 130 are designed together, rather than sequentially as is the case in conventional design approaches. Mathematically, using the notation of FIG. 1, the design step can be described as selecting the system parameters $\theta_o$, $\theta_d$ and $\theta_i$ to directly optimize the performance metric, possibly subject to certain constraints on the costs 170. For example, an image-based post-processing performance metric 190 may be optimized subject to a maximum financial cost. Alternately, the financial cost may be minimized subject to some minimum acceptable post-processing performance metric 190 for the digital image 180.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 1 and 2, there is no requirement for the optical subsystem 110, the detector subsystem 120 or the digital image processing subsystem 130, taken alone, to be optimal. It is quite possible for these subsystems to exhibit less than optimal performance when considered alone, while the overall electro-optic imaging system 100 still exhibits good or even optimal performance. This is in direct contrast to conventional design methods where, for example, the optical subsystem 110 typically is designed by directly optimizing the image quality of the intermediate optical image formed by it. For example, the optical subsystem 110 may be designed based directly on minimizing the RMS wavefront error or the RMS spot size. In contrast, for the design approach of FIG. 2, the intermediate optical image formed by the optical subsystem 110 may have worse image quality (e.g., as measured by wavefront error or spot size), which is then corrected by the digital image processing subsystem 130. The optical subsystem 110 is not designed based directly on improving the image quality of the intermediate optical image. Rather, it is designed jointly with the digital image processing subsystem 130, based directly on optimizing the post-processing performance metric 190.

Figure 3:
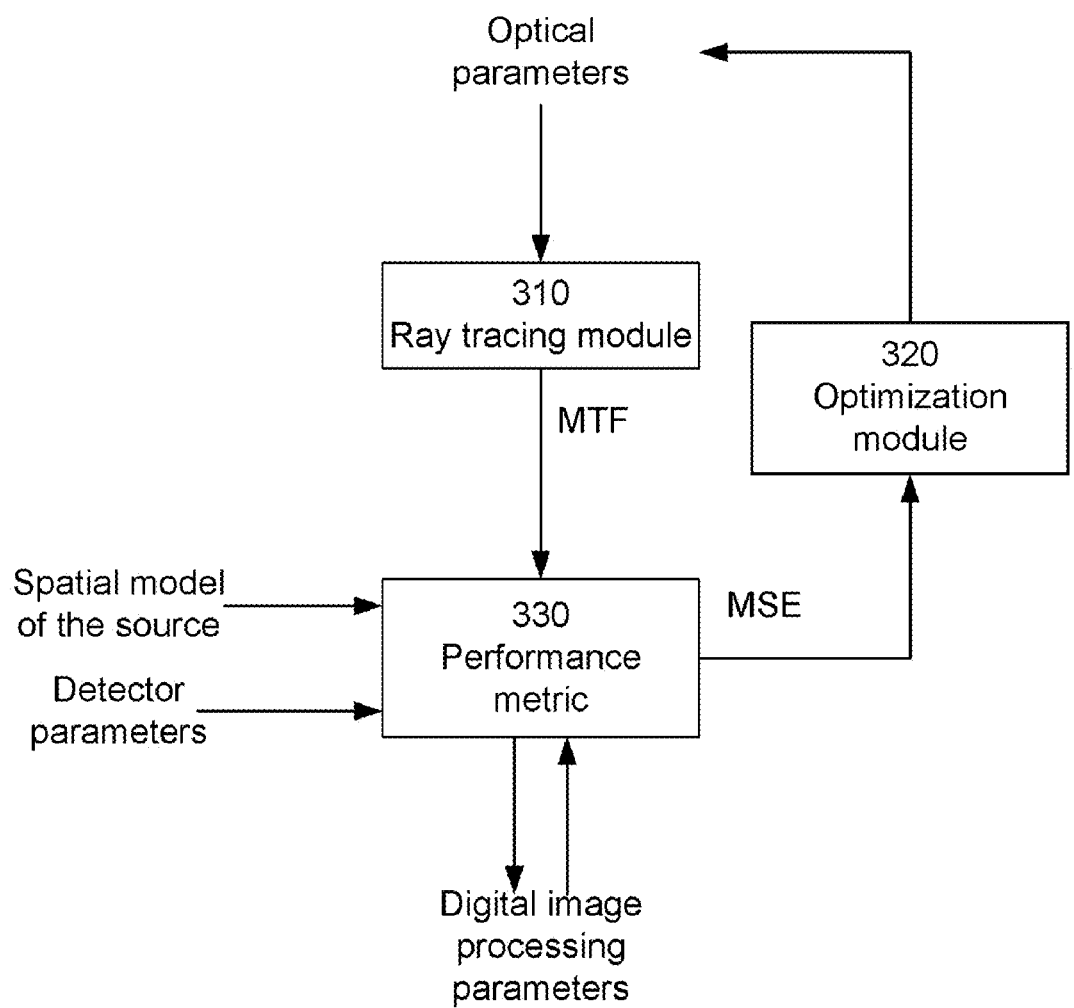
FIG. 3 is a block diagram illustrating one software implementation of the end-to-end design approach.

FIG. 3 is a block diagram illustrating one software implementation based on commercially available lens design programs, such as Zemax. These programs typically have ray tracing capability 310 as well as optimization capability 320. In a conventional lens design, the designer would first identify the potential design space for the lens system by entering a description of the lens design problem. This description typically would include source points to be ray traced and a general description of the lens system (curvatures, thicknesses, spacings, etc.) as well as which lens design parameters are to be iterated. The ray tracing module 310 would trace rays from the source points through the lens system to the image plane. The optimization module 320 would iterate on the optical design parameters in order to directly optimize some cost function, typically the OPD-RMS, subject to other design constraints (minimum edge thicknesses, edge spacings, etc).

The implementation of FIG. 3 takes advantage of the built-in ray tracing and optimization functions, but replaces the wavefront error function with a post-processing performance metric 330 that takes into account the entire electro-optical system. Specifically, the output of the ray tracing module 310 is the OTF of the optical subsystem (or information that can be used to calculate the OTF) for several locations across the image field. In this example, the OTF is spatially-varying and approximated by interpolation between grid points. This same approach can be used for spatially-varying point spread functions or MTFs. Module 330 receives the MTF information as one input. It also uses the spatial model of the source (which typically will be different than the source points used in the ray tracing), and information about the detector subsystem and digital image processing subsystem to model propagation of the source through the electro-optic imaging system.

The post-processing performance metric module 330 may have self-contained loops or optimizations. For example, a different digital image processing subsystem may be designed for each new OTF and this process may or may not be iterative. Module 330 outputs the post-processing performance metric, which is used by the optimization module 320 to iterate the design of the optical subsystem. Note that the design of the digital image processing subsystem changes as the design of the optical subsystem changes. Different image processing is used to compensate for different errors introduced by different optical subsystems. Thus, the optical subsystem and the digital image processing subsystem are jointly designed based on the post-processing performance metric. For example, the design software may generate linear filter coefficients, as well as the final optical subsystem design.

FIG. 3 is just one example implementation, which is driven primarily by the availability of ray tracing and optimization modules 310 and 320 in commercially available lens design programs. Other implementations will be apparent. For example, in an alternate embodiment, the software architecture is based on the block diagram of FIG. 1. One software module implements the spatial model of the source 150. Other modules implement propagation of the source through the various subsystems 110, 120 and 130. These propagation modules receive the current system parameters and cost functions as inputs. Another module receives the simulated digital image 180 and ideal image 155 as inputs, and calculates the post-processing performance metric 190 based on them. This is used to iterate the system parameters.

System Model in the Continuous Domain

Figure 4:
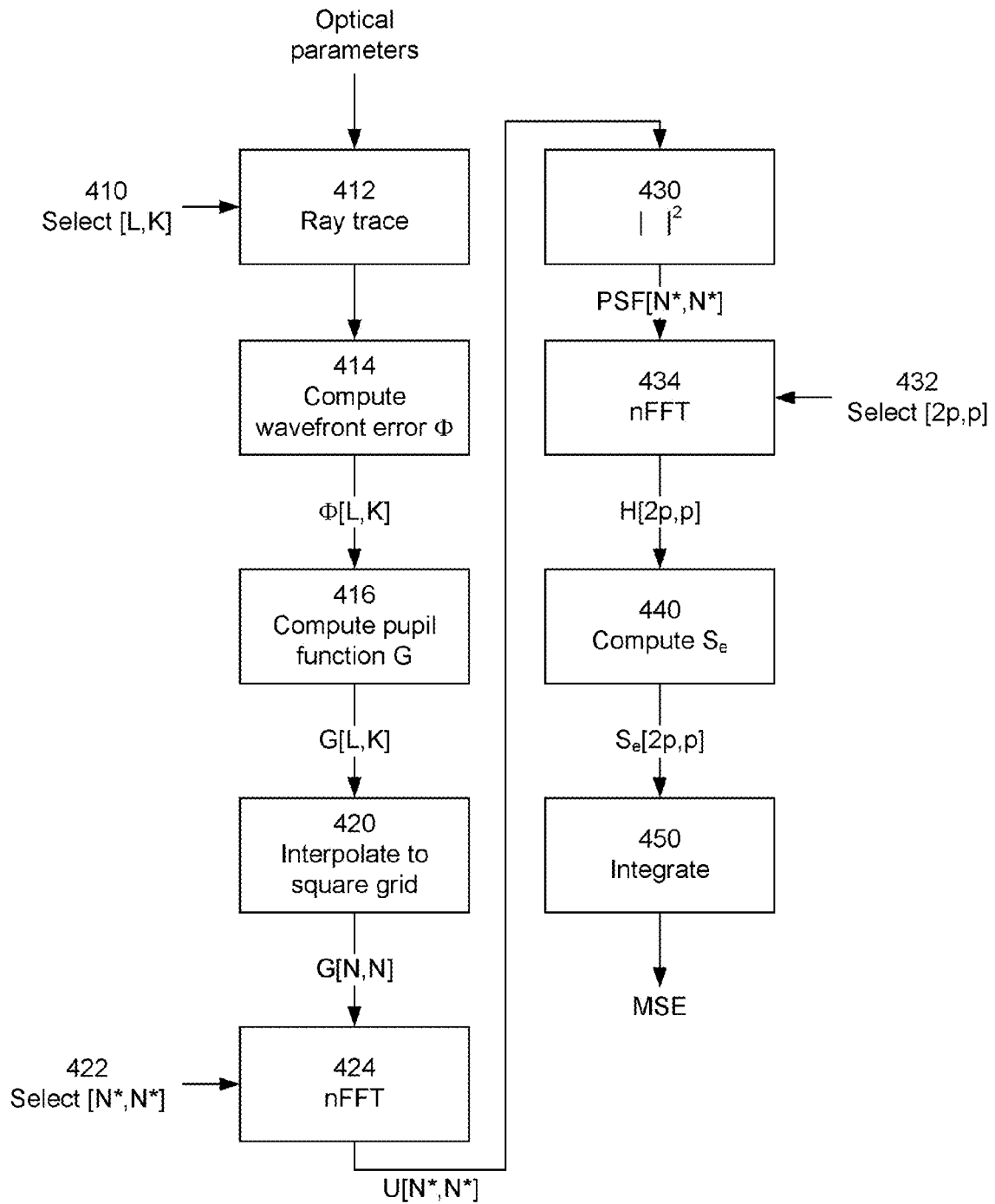
FIG. 4 is a block diagram illustrating one approach to calculating the performance metric of FIG. 3.

FIG. 4 is a block diagram illustrating one approach to calculating the performance metric 330 of FIG. 3. This approach is based on the following model of the electro-optic imaging system. The optical subsystem is characterized by a geometric measure of optical aberrations. Computing these quality measures involves tracing small sets of rays through the optical subsystem and computing a single number which measures the geometric deviation of these rays from those by a perfect optical system. The most common geometric measure is based on the optical path difference (OPD) between an ideal reference sphere and the actual wavefront at the exit pupil of the optical subsystem. This is known as the wavefront error function. This function, $\Phi(r, \phi)$, can be expressed in polar coordinates with normalized radius, that is, $\Phi: [0, 1] \times [0, 2\pi] \to C$. Typically, this wavefront error function is sampled using a small set of rays traced through the optical subsystem and combined using an $L_2$ norm. This figure of merit is referred to as the OPD-RMS. Computation of this optical figure of merit can be extremely efficient given that most field locations require tracing fewer than 20 rays per field location.

The diffraction integral is based on the pupil function, $G(r, \phi)$, defined as $$G(r,\phi) = A(r,\phi)\exp(i\Phi(r,\phi)) \qquad (1)$$

where A is the (non-negative) transmission function. For typical optical subsystems, the pupil function is an unobstructed pupil and thus we set A to be constant=1. For the remainder of this example, we consider $G(r, \phi) = \exp(i\Phi(r, \phi))$.

Applying a Fourier transform operator F to the pupil function performs the Fraunhofer approximation to the diffraction integral producing the complex-amplitude point-spread function U:

$$\begin{aligned} U(u, \theta) &= \mathcal{F}(G)(u, \theta) \\ &= \frac{1}{\pi} \int_0^1 \int_0^{2\pi} G(r, \phi)\exp[2\pi i r u \cos(\phi - \theta)] dr d\phi \end{aligned} \qquad (2)$$

The intensity point-spread function (or simply PSF) is given by $$\text{PSF} = |U|^2 \qquad (3)$$

The modulation transfer function (MTF) is the absolute value of the optical transfer function (OTF) H, which is given by $$H = F(\text{PSF}) \qquad (4)$$

The OTF H is a measure of the contrast capability of the optical subsystem. Higher values of H correspond to higher contrast levels.

In one approach, the performance metric 330 is the predicted mean-square-error (MSE) of the final digital image. Assuming Wiener filtering, the predicted MSE is a function of the optical subsystem's OTF H, the signal's power spectral density (PSD) function $S_{uu}$, and the noise power spectral density $S_{nn}$. Given these three components, the final digital image error spectral density is given by $$S_e(\omega_1, \omega_2) = \frac{S_{uu}(\omega_1, \omega_2) S_{nn}(\omega_1, \omega_2)}{|H(\omega_1, \omega_2)|^2 S_{uu}(\omega_1, \omega_2) + S_{nn}(\omega_1, \omega_2)} \qquad (5)$$

The quantity $S_e$ is a function of both the contrast capability of the optical subsystem (as reflected in H) and noise from the non-optical components (as reflected in $S_{nn}$).

Computation of the predicted MSE is based on integrating the error spectral density function over the spectral bandwidth of the electro-optic imaging system. Since electro-optical imaging systems of interest typically have a digital sampling rate that is much lower than the diffraction limit, the error $S_e(\omega_1, \omega_2)$ normalized by the diffraction limit D of the optical subsystem, is integrated only over the region where $|\omega_1| < u$, $|\omega_2| < u$, where u is the Nyquist frequency of the detector subsystem. The ratio $T = u/D$ is also called the undersampling factor of the system. The final MSE figure of merit is defined as $$MSE(u) = \frac{1}{2\pi} \int_{|\omega_1|<u} \int_{|\omega_2|<u} S_e(\omega_1, \omega_2) d\omega_1 d\omega_2 \qquad (6)$$

This MSE is then optimized relative to the design space of the optical subsystem, which implicitly also optimizes the digital image processing subsystem.

Traditional Discretization of the Continuous System Model

The calculation of the MSE, starting with ray tracing and following through the continuous model given by Eqns. 1-6, is typically implemented by a computer using discretized versions of Eqns. 1-6. The wavefront error function Φ is sampled at selected locations on the exit pupil through which rays are traced by ray tracing software. Once the wavefront error function values are available at those pupil locations the Fourier transform of the pupil function values is computed. In a conventional implementation of this step, the Fourier transform operator is substituted by the discrete Fourier transform (DFT) and implemented using a conventional FFT algorithm. However, in order to apply the conventional FFT algorithm to calculation of the complex-amplitude point spread function (see Eqn. 2), pupil function values must be made available on an N×N regular, rectangular grid. The sampling grid is regular in the sense that, along each dimension, the spacing between two adjacent samples is always the same, although the sample-to-sample spacing may be different in the x and y directions. Usually, the sample-to-sample spacing is the same in the x and y directions, so the sampling grid would be a regular square grid. For example, a commonly used setting might sample the pupil on a regular square grid of size N=64. In order to compute the FFT without aliasing, the N×N pupil function values are zero-padded by a factor of 2 in each dimension. As a result, samples of the complex-amplitude point spread function are obtained on a 2N×2N square grid (e.g. 128×128 grid).

In order to compute the OTF, typically no zero-padding of the intensity PSF is performed before applying the conventional FFT to the PSF. As a result, OTF samples on a 2N×2N square grid are obtained. The discretization of the integration over the Wiener filter error estimate $S_e$ is performed via approximation by numerical integration using the rectangle rule with rectangle width equal to 1/N for all values of T∈(0, 1]. For example, the Wiener filter error $S_e$ may be computed on a 128×128 grid. Subsequently, the numerical integration via rectangle rule is performed over the samples in the grid interval $[-B, B]^2$ with B=TN.

$$MSE = (2TN)^{-2} \sum_{-B \leq n,m \leq B} S_e(n, m) \quad (7)$$

Using regular rectangular grids at all sampling steps in the system model enables the use of the conventional FFT in computing the MSE, but results in the following bottlenecks. First, Eqn. 2 calls for the Fourier transform of the pupil function G, which depends on the wavefront error function Φ. If the conventional FFT is used to compute this Fourier transform, then G and Φ must be sampled on a regular rectangular grid of a certain density and extent in order to achieve sufficient sampling for later functions. The total number of sample points required can be fairly high. The wavefront error function Φ is determined by ray tracing. Requiring a large number of samples of Φ on a regular rectangular grid requires tracing a large number of rays, which is computationally expensive.

Second, for low-resolution sensors (e.g., u<0.2), the approximation of the integral of Eqn. 6 via the rectangle rule can require a large number of PSF samples in order to achieve acceptable accuracy. This, in return, requires many samples of Φ and corresponding amounts of ray tracing.

More Efficient Discretization of the Continuous System Model

FIG. 4 uses a different, more computationally efficient discretization of the continuous system model given by Eqns. 1-6. Use of the conventional FFT requires the use of regular rectangular sampling grids in both the space and (spatial) frequency domains, and dictates a specific relationship between the extent of the sampling grid in the space domain and the corresponding sample spacing in the frequency domain. For example, if N×N square grids are used and the sample spacing is Δx and Δy in the space domain, then this dictates that the sample spacing will be a specific Δp and Δq in the frequency domain and the extent of the sampling grid will be NΔp×NΔq (where p and q are the spatial frequency coordinates). If a different sample spacing or sample extent is desired in the frequency domain, corresponding changes must be made in the space domain in order to use the conventional FFT.

Instead of requiring sampling grids based on the conventional FFT for all sampling operations, FIG. 4 adds flexibility to the sampling operations by allowing grids of different topology at various locations in the system model. One advantage of this added flexibility is to adapt the sampling topology to the subsystem parameters such as optical aberrations or sensor characteristics. Since the acceptable grid topologies will not necessarily form regular rectangular grids of the correct sample spacing or sample extent, applying the conventional FFT algorithm to propagate source information from the original optical source to the final digital image may no longer be the most computationally efficient.

In the following example, conventional FFT operations are replaced by nonequidistant FFT (nFFT) operations. A non-equidistant FFT uses a fast algorithm for calculation for the discrete Fourier transform, but the samples in the space domain and/or in the frequency domain are not all equally spaced. Consider a one dimensional example. In the equidistant (or conventional) FFT, assume K space domain samples at a sample spacing of Δx. Thus, the actual sample locations might be x=0, Δx, 2Δx, . . . (K−1)Δx. Recall also that the FFT is based on a periodic function with period (or sample extent) of $T_x$=KΔx. Thus, the space domain samples are all equidistant, including accounting for the periodicity. That is, the sample spacing is constant between the 0th sample to the 1st sample, the 1st sample to the 2nd sample, and so on all the way including the sample spacing between the (K−1)st sample to the Kth (0th) sample. The corresponding frequency domain period (or sample extent) $T_p$ is determined by $T_x$. The frequency domain samples must then have a sample spacing of Δp=$T_p$/K. This sample spacing yields equally spaced samples in the frequency domain.

In the nFFT, the sampling requirements for the conventional FFT are not met. For example, the frequency domain samples may be spaced by δp≠Δp. If there are K samples, then the sample extent in the frequency domain is K δp≠$T_p$. In this situation, the frequency domain sampling will be described as on a regular grid, but the samples are not equidistant since the distance from the 0th to the 1st sample is not the same as the distance from the (K−1)st sample to the Kth sample. In another example, the frequency domain samples may be on an irregular grid. For example, the distance from the 0th to the 1st sample may be different than from the 1st to the 2nd sample. The general case where the sampling requirements for the conventional FFT are not met will be referred to as the nonequidistant DFT. The nDFT includes both the case where a fast algorithm is used (nFFT) and not.

Referring to FIG. 4, steps 410, 422 and 432 show the non-traditional sampling:

Step 410 determines sampling for pupil sampling (i.e., ray tracing), which in this example uses an L×K sampling that is not regular, rectangular sampling Step 422 determines sampling for computation of the PSF, which in this example uses an N*×N* square sampling Step 432 determines sampling for computation of $S_e(\omega_1, \omega_2)$ and MSE, which in this example uses 2p×p sampling The introduction of flexible sampling topologies allows one to choose sampling topologies that better match system characteristics, such as choosing a polar grid for OPD sampling or a quadrature grid for $S_e$ sampling. A direct consequence is that fewer rays typically must be traced compared to the traditional high-resolution rectangular grid. Less ray tracing means faster execution time. In some numerical experiments that have been performed, tracing approximately 240 rays using the flexible sampling described below yields the same MSE accuracy as tracing 4096 rays using the traditional high-resolution rectangular sampling. This leads to a speed-up by a factor of 20.

In more detail, steps 410-416 concern sampling the pupil function G. The pupil sample locations are determined 410. In FIG. 4, the sample locations are an L×K array of samples. Rays are traced 412 through the selected pupil locations. Based on the ray trace, wavefront error function Φ is calculated 414. The pupil function G is then determined 416 based on Eqn. 1 above.

At this point, the pupil function G is sampled at the L×K locations. In FIG. 4, the PSF is determined on a regular square grid, so the L×K samples of the pupil function are interpolated 420 to yield values of the pupil function G on an N×N regular, square grid. An appropriate value for N depends on the complexity of the optical design. It should be large enough so that diffraction effects are represented in the PSF computed from the N×N samples. In the numerical experiments described below, N typically was at least 64.

In step 422, the N*×N* regular square sampling grid for the PSF is determined. The complex-amplitude point spread function, sampled on an N*×N* grid, is then calculated from the pupil function G, sampled on an N×N grid, using the nFFT 424. This is the discrete form of Eqn. 2. Both the N×N and N*×N* grids are regular square grids, but the sample spacing does not meet the requirements for the conventional FFT. The amplitude squared operator 430 implements Eqn. 3 to yield the PSF, sampled on an N*×N* grid. Unlike the traditional approach, N and N* are not constrained by a conventional FFT relationship. Instead, N* can be more freely selected. N* typically can be less than or equal to N. In one approach, N* is set equal to N. In many cases, the spread of the PSF is contained in a smaller area so N* can be set much lower. Setting, N*=N/2 yielded good results in the numerical experiments below.

In step 432, the 2p×p sampling for $S_e$ is determined. This formulation takes advantage of the fact that the integrand $S_e$ is a symmetric function. Therefore, computing the quadrature on one half-plane is sufficient. The symmetry is caused by the PSF being real and the OTF being the Fourier transform of a real function, which is symmetric, and by the other quantities $S_{uu}$, and $S_{nn}$, also being modeled as symmetric. The nFFT implements Eqn. 4, calculating 2p×p samples of the OTF H based on N*×N* samples of the PSF. Eqn. 5 (calculation of $S_e$) is implemented in step 440 and Eqn. 6 (calculation of MSE) in step 450. In this particular example, quadrature-type numerical integration is used, which determines the 2p×p sampling. The value of p depends on the smoothness of the integrand function $S_e$. If $S_e$ can be well approximated by a polynomial of order 2p, then p nodes in Gauss quadrature are sufficient.

Now consider selection of the different samplings. Some of the following samplings are benchmarked against a singlet design:

F/4.6

Thickness of surface 1 in the range 0 to 3 mm, sampled at 25 equally spaced locations.

Curvature on surface 2 in the range −0.1 to 0.1 (inverse mm), sampled at 25 equally spaced locations.

The Zemax design software outputs the four Seidel aberrations astigmatism, coma, spherical aberration, and field curvature for this design. Data generated initially from a sampling of the pupil at high resolution serves as ground truth data. For this the sampling size in one dimension N is set to 256 or 64. Applying the traditional sampling approach to this starting resolution, the PSF and the error estimate $S_e$ are then both evaluated on a 2N×2N grid.

Sampling of the Pupil Function

The wavefront error function can usually be well approximated in the continuous domain by only a few Seidel aberration terms forming a polynomial of lower order. Therefore, we sample the pupil at selected locations and interpolate the values at the grid locations from those given samples instead of directly applying ray tracing to all of the N×N square grid locations. Due to the representation of Seidel aberrations as polynomials in radius and angle, in this example, we use a polar grid restricted to a few rings and arms.

Since most of the Seidel aberrations are of order of at least 2 in r, it is recommended to sample the radial direction at $r_l = t_l^2$ where $t_l = l/L$ is an equally spaced sampling of the interval [0, 1] for L+1 samples, l=0, ..., L. In the presence of very high coma, it may be better to change to a linear sampling, i.e. $r_l = t_l$. The angular domain is sampled linearly as $\theta_k = 2\pi k/K$ for K samples, k=0, ..., K−1.

Following the sampling, bilinear interpolation is performed to compute approximate wavefront error values at square grid locations. This forms the basis of the pupil function approximation.

In order to assess the accuracy of a particular sampling scheme, the wavefront error function is evaluated for each location in the aberration space A of the benchmark design. This aberration space includes the four aberrations astigmatism, coma, spherical aberration, and field curvature. Defocus is added to this set. Given a set of undersampling factors {0.05, 0.1, 0.15, 0.2, 0, 25, 0, 3, 0.35, 0.4, 0.45, 0.5}, a range of defocus [−6, 1] is determined experimentally from the ground truth data that contains the globally optimal MSE solutions for all undersampling factors. The wavefront error function computed via ray tracing to all locations of an n×n square grid is denoted by $OPD_{n \times n}$. In contrast, the wavefront error function computed via ray tracing at all the locations of the L×K polar grid and then interpolated to an n×n square grid is denoted by $OPD_{L \times K \to n \times n}$.

As a first step, a distance between OPD values for different sampling strategies is defined. For the ground truth MSE values J, the location w* of the global minimum of the MSE merit function is determined as $$w^* = \mathrm{argmin}_{w \in A} J(w) \qquad (8)$$

The defocus component of w* is denoted by $w_{20}^*$, and an epsilon neighborhood around that component defined as $\epsilon(w_{20}^*)$. In the experiments presented here, the size for the neighborhood, in terms of samples on a regular rectangular grid of size 25×25, is set to $\epsilon=4$.

For each location w in the 5-dimensional aberration space A, the $L_2$ error between the sampled OPD values of the ground truth data and the sampling strategy under test is computed as $$d_{OPD}[K,L,n](w) = \|OPD_{n \times n}(w) - OPD_{L \times K \to n \times n}(w)\|_{L^2} \quad (9)$$

The distance of OPD values over the entire design space is now defined as $$d_A[K, L, n](OPD_{n \times n}, OPD_{L \times K \to n \times n}) = \quad (10)$$

$$\int_\Omega \int_{\in (w_{20}^*)} \|OPD_{n \times n}(w, w_{20}) - OPD_{L \times K \to n \times n}(w, w_{20})\|_{L^2} dw_{20} dw$$

where $\Omega$ is the aberration subspace containing only the four Seidel aberrations and not defocus. The restriction of the defocus dimension to a neighborhood around the optimal location is performed since the location varies with the undersampling factor, and integration over the entire defocus interval would, therefore, lead to some bias. In essence, the approximation error is captured in a neighborhood around the position of optimal focus. The distance measure $d_A$ is used to measure the approximation accuracy of the wavefront error. We base $d_A$ on OPD values since OPD is a well understood measure of aberration strength in the optical design community.

In a second step the following distance measure between MSE values is introduced.

$$d_J[K, L, m, nT](MSE_{n \times n}, MSE_{L \times K \to m \times m}) = \quad (11)$$

$$\left[ \int_\Omega \int_{\in (w_{20}^*)} \begin{vmatrix} MSE_{n \times n}(w, w_{20}) - \\ MSE_{L \times K \to m \times m}(w, w_{20})^2 dw_{20} dw \end{vmatrix} \right]^{0.5}$$

The two measures $d_A$ and $d_J$ evaluate the differences between OPD and MSE values obtained via different sampling strategies averaged over the entire singlet design space restricted around the optimal defocus location and are, therefore, reasonable global approximations.

Figure 5:
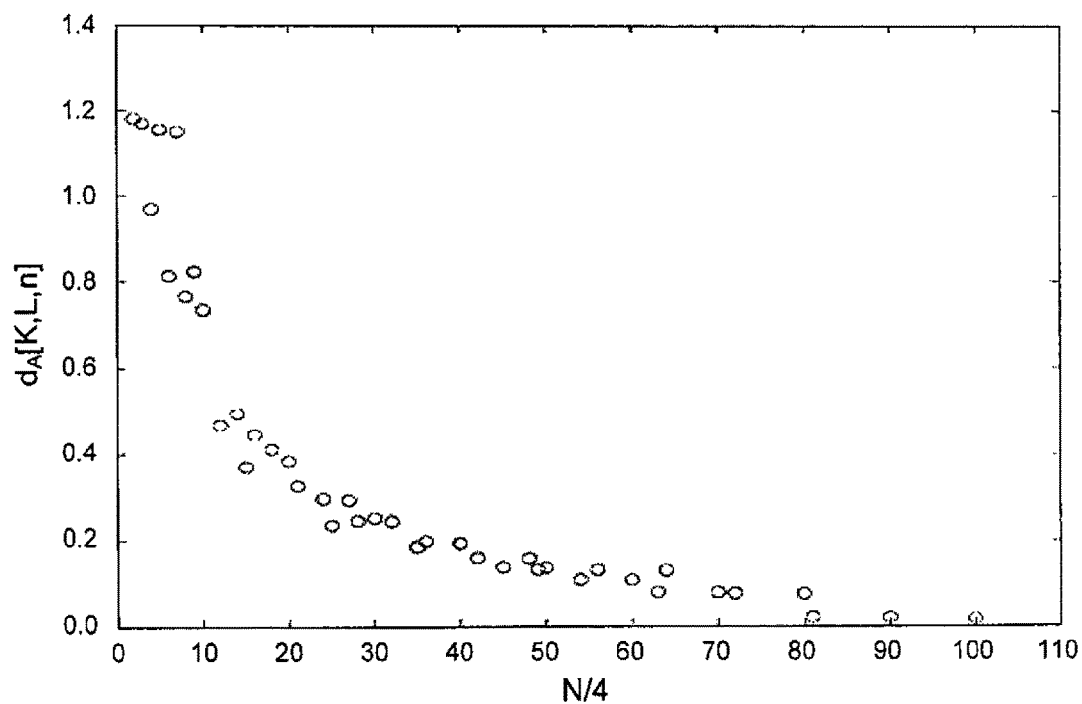
FIG. 5 is a plot of aggregate OPD error versus number of rays traced.
Figure 6A:
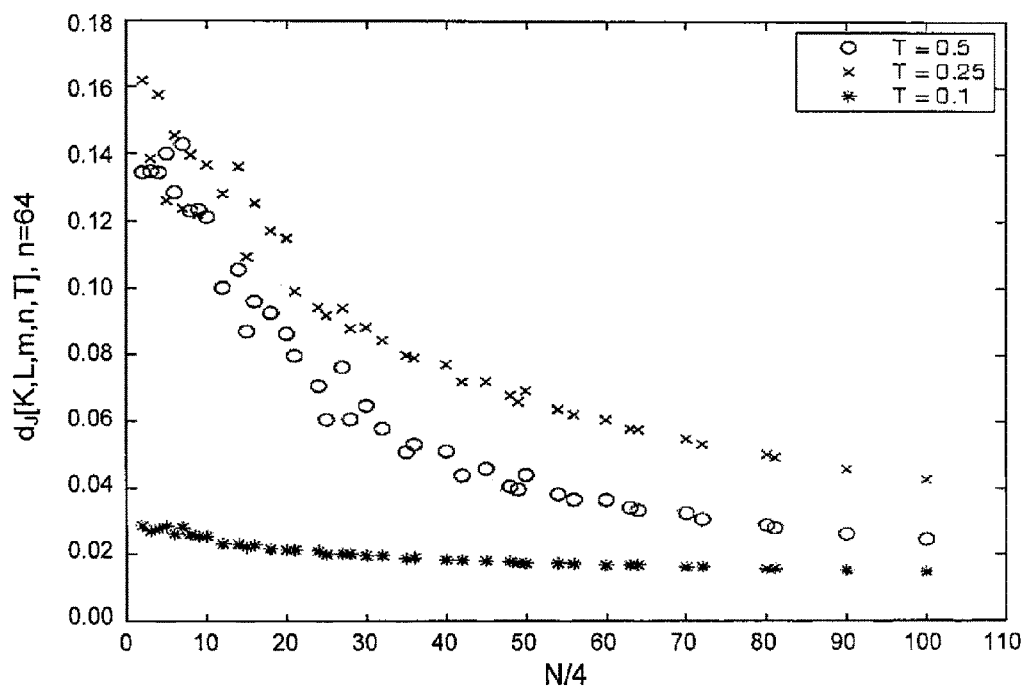
FIGS. 6A and 6B are plots of aggregate MSE error versus number of rays traced.
Figure 6B:
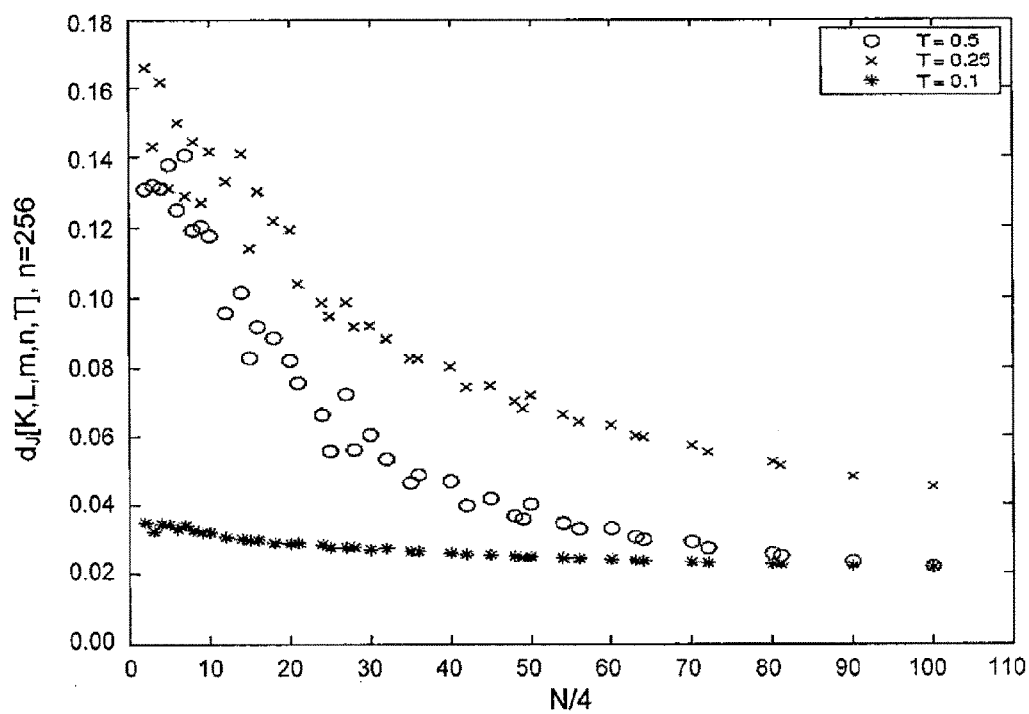

FIGS. 5 and 6 show results using these two error measures for a field location of h=0.95. In FIG. 5, OPD differences are measured via $d_A[K, L, n]$ for n=64 and various polar grids L=2, ... 10, K=4, ... 32. In FIGS. 6A and 6B, MSE differences measured via $d_J[K, L, m, n, T]$ are computed for different polar grids determined by pairs (L, K), L=2, ... 10, K=4, ... 32; a selection of undersampling factors T=0.1, 0.25, 0.5; and different square-grids of size n×n. In FIG. 6A, n=64 and n=256 in FIG. 6B. The variable N reflects the total number of rays to be traced for the polar grid sampling and is computed as $$N = L \cdot K \quad (12)$$

The graph of FIG. 5 shows that the pupil function error is less than 1/10 wave OPD-RMS at N/4=60. The graphs in FIG. 5 suggest that tracing N=240 rays through a polar grid is enough to obtain an acceptable error of approximately 0.1 waves in the OPD approximation.

The MSE measures $d_J$ in FIG. 6 for undersampling factors of T=0.1, 0.25, 0.5 seem to be well correlated with the OPD measure. Some differences between a square grid resolution of 64×64 and 256×256 are noticeable, e.g. for T=0.1 the values for grid resolution of 64×64 seem to be larger in general, but the correlation with the OPD values does not change. Based on this observation, we use a square grid of 64×64 for ground truth data generation in the following sections.

A general rule of thumb in traditional optical design is that the Peak-to-Valley OPD should be $\leq$1/4λ which should be 3-5 times the OPD-RMS. The P-V OPD of $\leq$1/4 is correlated with a Strehl ratio of 0.80. This rule of thumb is applied to optical designs used in a variety of areas such as astronomy (microscopes) and microlithography. Therefore, an OPD-RMS value of $\leq$0.1λ seems to certainly fulfill the design criteria for optical image quality for a JOIPO system. Smaller values for L and K may lead to decreased accuracy. However, it depends on the purpose of the overall design what level of accuracy is acceptable. For example, in an initial design phase it may be acceptable to perform the optimization to an accuracy level of OPD difference of $\leq$0.5λ from ground truth data, but once an initial design has been determined, fine-tuning of the design can be performed by increasing the accuracy level and setting the OPD error threshold to 0.1λ.

The above example is based on polar sampling. However, other sampling schemes can also be used, for example linogram sampling.

Interpolation of the Pupil Function onto Rectangular Grid

In order to allow for accurate computations of the Fourier transform of the pupil function samples, an interpolation from the selected pupil sampling grid values to values on a grid with higher sampling resolution in a neighborhood of the boundary of the pupil may be necessary. In one embodiment, the pupil sampling grid values are interpolated to a regular square grid of size N=64. Interpolation may be performed via linear interpolation on triangles using barycentric coordinates or bilinear interpolation on trapezoids, for example.

Sampling of the Point Spread Function (PSF)

The PSF is defined in the spatial domain. Even though in theory the support of the PSF for a diffracted optical system in the continuous model is infinite, in the discretized case the approximated PSF function has finite support. In FIG. 4, that support is included in an interval of N*×N* samples, typically centered at the origin of the PSF. The size N* depends on the magnitude and characteristics of the aberrations, for example by the locations where the marginal and chief rays hit the image plane or from the ray fan diagram. In the traditional approach, the PSF is sampled on a 2N×2N grid, where N was the size of the regular square grid that was used for pupil sampling. The flexible approach reduces the number of samples of the PSF, thus leading to decreased computational complexity.

Sampling and Integral Approximation of MSE

In the traditional approach, the Wiener filter error estimate is oversampled. Values of $S_e$ are computed via FFT at frequency locations equally spaced in the interval $[-1, 1]^2$. For an undersampling factor of T<1 however, integration of $S_e$ takes place only over a subinterval $[-T, T]^2 \subset [-1, 1]^2$. That means not all frequency locations evaluated by the FFT are needed in the integration. Furthermore, for small undersampling factors, it is not clear whether the uniform discretization of the frequency locations by the FFT provides enough samples in the small interval $[-T, T]^2$ to accurately estimate the MSE error. Accuracy of numerical integration can be controlled by applying a quadrature-type integration method. The general concept of numerical integration via quadrature is to approximate the integral over a function $f$ as a finite sum of weighted function values of $f$ at certain locations.

$$\int_a^b f(x)dx \approx \sum_{k=1}^p w_k f(x_k) \quad (13)$$

The locations $x_k$ are called nodes and the parameters $w_k$ are the weights of the quadrature. p is called the order of the quadrature. If the integrand can be written as $f(x)=g(x)W(x)$ where $g(x)$ is approximately polynomial and $W(x)$ is known, then the nodes are linked to zeros of certain orthogonal polynomials. The most popular type of quadrature is Gauss quadrature. In this case $W(x)=1$, $[a, b]=[-1, 1]$, and the nodes are zeros of Legendre polynomials being independent of the integrand function $f$. The accuracy of the approximation depends on the smoothness of the function $f$. If $f$ is a polynomial of order $2p$, then a Gaussian quadrature of order $p$ is enough to represent the integral exactly.

When trying to apply the quadrature approach to the integration of $S_e$, note that the integrand is not a very smooth function. The MTF function $|H|$ is continuous, but may not be everywhere differentiable. Therefore, we cannot expect that a low order quadrature will give acceptable results. Experimentally we investigated what order of a polynomial approximation of $S_e$ yields acceptable results. For field point $h=0.95$ and $T=1$ we picked a location $w$ with $w_{20}=-2.75$, $w_{astig}=1.4089$, $w_{coma}=-1.2602$, $w_{spherical}=1.5578$, $w_{fc}=2.7198$ near the global minimum location of the MSE merit function and determined experimentally by visual inspection that a polynomial of order 26 seems to provide an acceptable fit.

Figure 7:
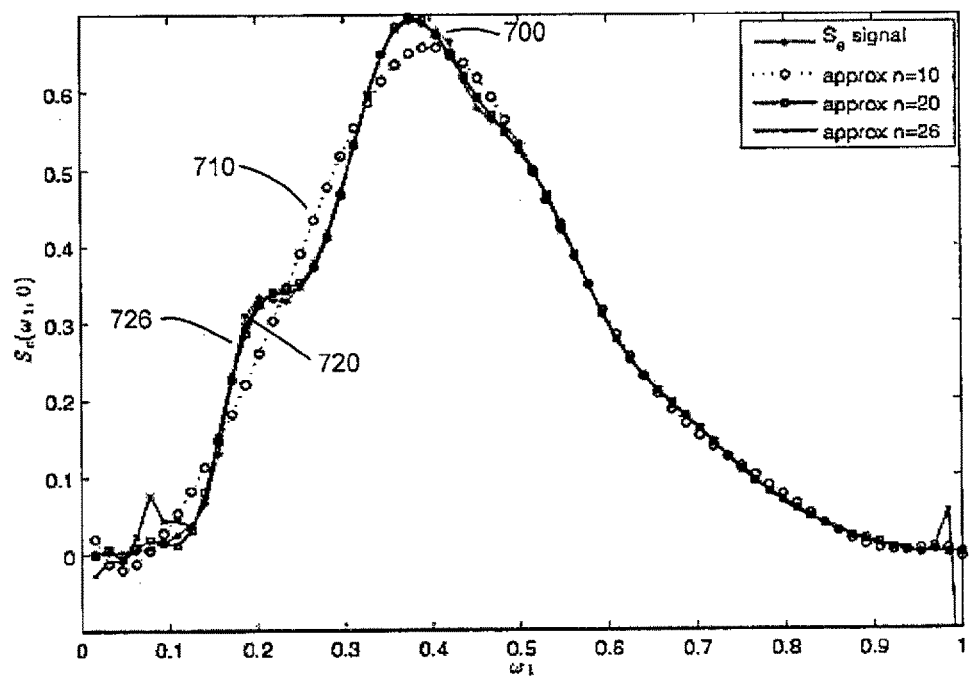
FIG. 7 is a one-dimensional cut through $S_e$, showing approximations by different order polynomials.

FIG. 7 plots a one-dimensional cut through the $S_e$ values for the example location in aberration space. The curve 700 represents the computed signal $S_e(\omega_1, 0)$ and the curves 710, 720 and 726 represent polynomial fits of orders 10, 20 and 26 respectively. The order 20 and 26 fits match the computed signal well. Fitting $S_e$ with a polynomial over the entire square $[-1, 1]^2$ did not give very good results due to strong even symmetry properties of $S_e$. From these experimental results, a quadrature approximately of order $13=26/2$ should produce acceptable results in the numerical integration. Note that in this example $S_e$ is a function with axial symmetry around at least one of the axes caused by the fact that the PSF is a real-valued function.

Assuming we want to perform integration via quadrature, we need to evaluate the integrand function at the quadrature node locations. These locations may differ from the ones provided by the FFT. To solve this problem we apply the nonequidistant DFT (nDFT) to the PSF in order to compute the OTF at the quadrature node locations. The nDFT may be implemented by a nonequidistant FFT, which may be based on FFT(s) followed by interpolation.

Figure 8A:
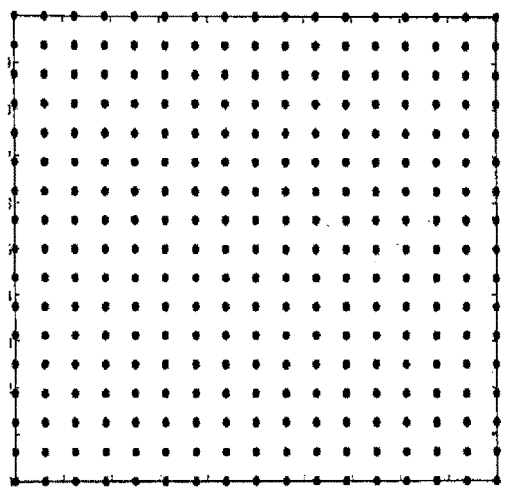
FIGS. 8A-8C are plots of quadrature node locations for different types of numerical integration.
Figure 8B:
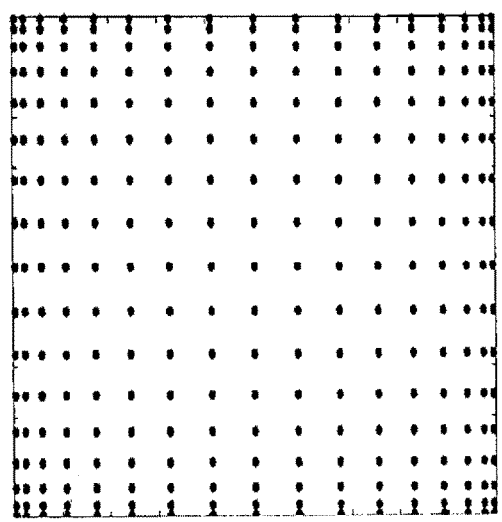
Figure 8C:
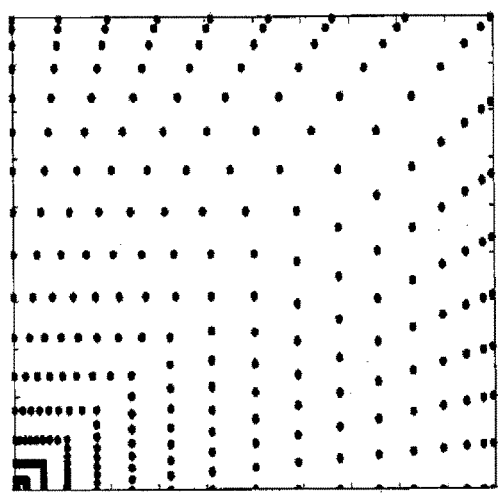

In general the numerical approximation of the 2-dimensional MSE merit function is defined as follows $$MSE[T] \approx \sum_j \sum_k u_{j,k} S_e(\omega_{1,j}, \omega_{2,k}) \quad (14)$$

with $\omega_{1,j}, \omega_{2,k}$ being sampling locations in the interval $[-TN, TN]$. As examples, consider the following different strategies related to numerical integration and quadrature. Without loss of generality, we describe the different approximation techniques in the following over the first quadrant $[0, T]\times[0, T]$ only. FIGS. 8A-8C shows the sampling grids for the numerical integration techniques described below, for order $p=16$.

Traditional: Rectangle rule, sampled on a regular rectangular grid. The traditional approach uses FFTs to compute $S_e$ at frequency locations on an equally spaced square grid. The integral is approximated using the rectangle rule. The integration restricted to the first quadrant is approximated as follows.

$$JMSE[T] \approx \sum_{j=0}^{P} \sum_{k=0}^{P} q_j v_k S_e(x_j, y_k) \quad (15)$$

with node locations $$x_j = \frac{jT}{p}, y_k = \frac{kT}{p}, j = 0, \ldots, p, k = 0, \ldots, p,$$

and weights $$q_j = v_j = \frac{1}{p+1},$$

where the size of p relates directly to the quality of the approximation and is called the order of the approximation. In the traditional approach, p is set to $p=\lfloor N \times T \rfloor$. FIG. 8A shows a square grid sampling.

Trapezoidal sampled on a regular rectangular grid. The integration accuracy can be improved by using the trapezoidal rule for integration. That means $$JMSE[T] \approx \sum_{J=0}^{P} \sum_{K=0}^{P} q_j v_k S_e(x_j, y_k) \quad (16)$$

with node locations $$x_j = \frac{jT}{p}, y_k = \frac{kT}{p}, j = 0, \ldots, p, k = 0, \ldots, p,$$

and weights $$q_j = v_j = \frac{1}{p} \text{ for } j = 1, \ldots, p-1, q_0 = v_0 = \frac{1}{2p}, q_N = v_N = \frac{1}{2p}.$$

FIG. 8A shows a square grid sampling.

Gauss quadrature. If the Gauss-Legendre quadrature is applied in each dimension separately then the integral is approximated by $$JMSE[T] \approx \sum_{J=1}^{P} \sum_{K=1}^{P} q_j v_k S_e(x_j, y_k) \quad (17)$$

where p is the order of the quadrature; $x_j$ and $y_k$, for j, k=1, ..., p are the quadrature nodes; and $q_j$, $v_k$, for j, k=1, ..., p are the quadrature weights. Since for a Gauss quadrature the nodes are not located on a regular rectangular grid, the values of the OTF cannot be calculated with a regular FFT, but a nonequidistant DFT (nDFT) can be used instead. FIG. 8B shows the quadrature nodes.

Gauss quadrature in radial trapezoidal rule in angular sampled on a modified polar grid. Due to the radial symmetry of the PSF it is useful to consider the polar representation of $S_e$.

$$\int_0^T \int_0^T S_e(\omega_1, \omega_2) d\omega_1 d\omega_2 = \int_0^{\frac{\pi}{2}} \int_0^{r(\theta,T)} S_e(r, \theta) r dr d\theta \qquad (18)$$

with $\omega_1 = r \cos \theta$ and $\omega_2 = r \sin \theta$.

Since the sensor's geometric shape is usually a square rather than a circle, the quadrant preferably is sampled on a "modified polar grid" and not on a regular polar grid. The modified polar grid samples the entire rectangular quadrant, not just an angular segment. Therefore, the upper bound in the integration over the radius r depends on the undersampling factor T and the angle θ.

The angular integral is approximated by integration via the trapezoidal rule, whereas the Gauss-Legendre quadrature is applied to the radial integral.

$$JMSE[T] \approx \sum_{k=0}^{p} v_k \sum_{j=1}^{p} q_r \cdot r_j \cdot S_e(x_{jk}, y_{jk}) \qquad (19)$$

where p is the order of the quadrature; $(x_{jk}, y_k)$, j=1, ..., p, k=0, ..., p are the nodes on the modified polar grid with $x_{jk} = r_j \sin \theta_k$, $y_{jk} = r_j \cos \theta_k$ for $$\theta_k = \frac{k\pi}{2p} \text{ and}$$

$$r_j = \begin{cases} T \cdot \frac{1}{\cos y_k}, & 0 \le \theta_k \le \frac{\pi}{4} \\ T \cdot \frac{1}{\cos(\frac{\pi}{2} - y_k)}, & 0 \le \theta_k \le \frac{\pi}{2} \end{cases}$$

$q_j$, j=1, ..., p are the quadrature weights; and $$v_k = \frac{k\pi}{2p}$$

are the weights for integration via trapezoidal rule for $$k = 1, \ldots, p-1, v_0 = v_p = \frac{\pi}{p}$$

for the angular dimension. The values of $S_e$ at node locations $(x_{jk}, y_{jk})$ preferably are computed with an nFFT. FIG. 8C shows the locations of the quadrature nodes.

Accuracy. We numerically analyze the approximation properties of the various integration methods for one location in the aberration space of the benchmark design: $w_{astig}=1.4089$, $w_{coma}=-1.2602$, $w_{spherical}=1.5578$, $w_{fc}=2.7198$ and field location h=0.95. This location is close to the optimal location for minimal MSE over the entire design space for that field location. The field location is chosen since it is close to one of the quadrature nodes used when integrating the merit function over the entire field of view.

Figure 9A:
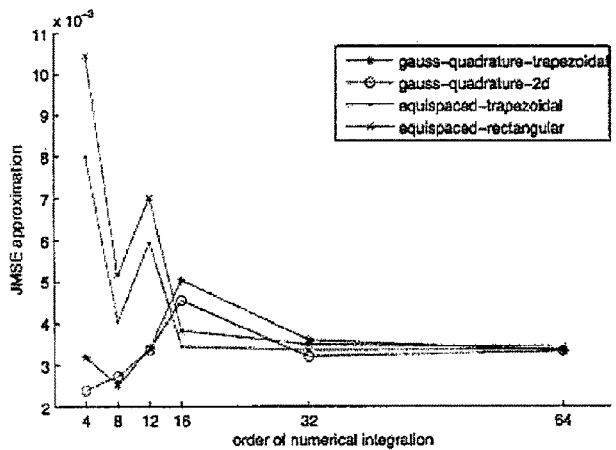
FIGS. 9A-9C are plots of MSE approximation as a function of order of the approximation.
Figure 9B:
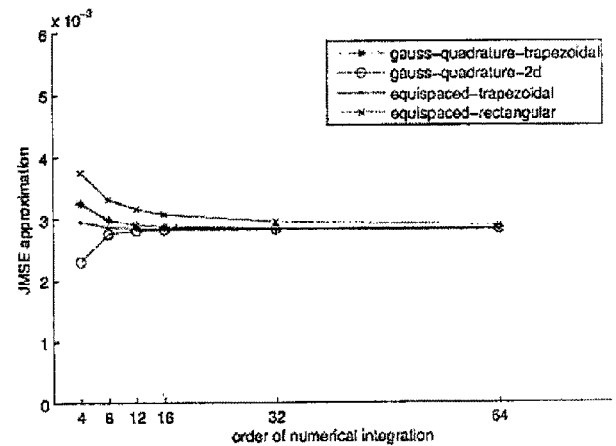
Figure 9C:
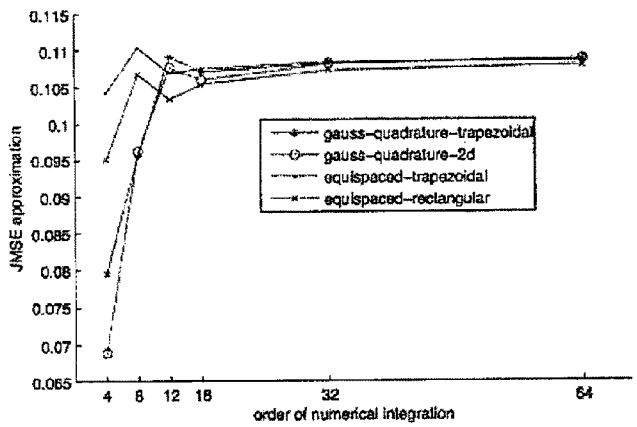

For this aberration example, the MSE value is computed for T=0.2 and three focus locations $w_{20} \in \{-6.0, -2.75, 1.0\}$ using different orders p=4, 8, 12, 16, 32, 64 in the numerical integration, starting always with PSF values sampled on a 128×128 grid. The value $w_{20}=-2.75$ is close to the optimal defocus location, whereas the other two values are at the boundary of the considered defocus interval [−6.0, 1.0]. FIGS. 9A-9C plot the results. FIG. 9A corresponds to $w_{20}=-6.0$, FIG. 9B to $w_{20}=-2.75$ and FIG. 9C to $w_{20}=1.0$. In each of these figures, there are four curves, corresponding to traditional rectangular integration, trapezoidal, Gauss quadrature in two dimensions, and the Gauss-quadrature-trapezoidal method described above.

Ideally, the MSE values for a specific value of T computed for different orders p should be constant, i.e. should lie on a horizontal line. In all graphs diverging behavior for small orders of integration is visible. For the two focus locations away from the optimal one the methods using an equispaced grid show some erratic behavior at small values of p, whereas the quadrature methods yield a more consistent drop. For $w_{20}=-2.75$ close to the optimal defocus location all methods seems to provide acceptable results even for small values of p, whereas for defocus location far away from the optimal one MSE values become unstable for small p. In general an order of p≧16 seems to produce stable results across all three defocus locations in this example.

Figure 10:
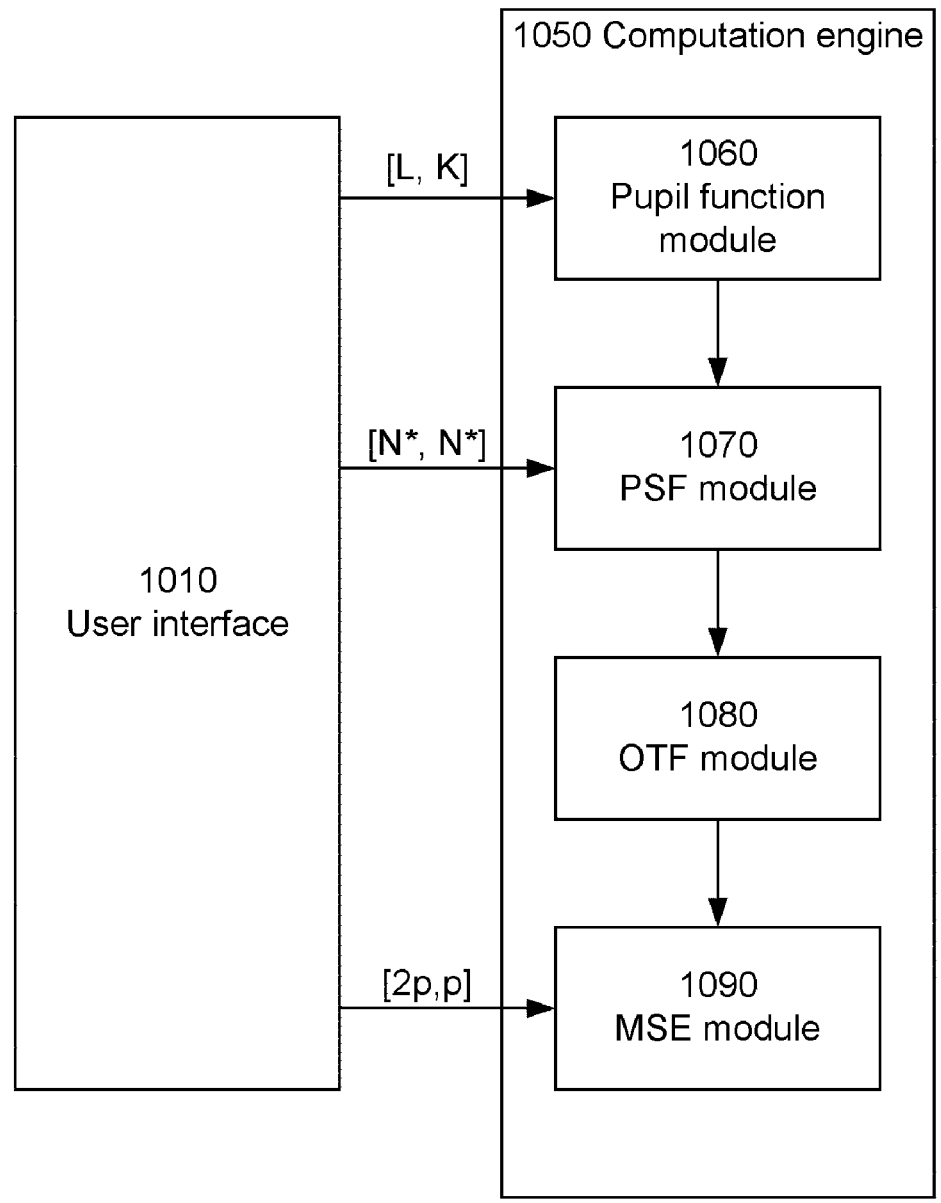
FIG. 10 is a block diagram of a system illustrating user control over sampling.

FIG. 10 is a block diagram of a system illustrating user control over sampling. The system includes a user interface 1010 and a computation engine 1050. In one embodiment, these are implemented as software executing on a computer system. The computation engine 1050 includes different modules that implement the various computations. The pupil function module 1060 calculates the pupil function G. This is typically achieved by ray tracing the optical subsystem according to the selected pupil sampling scheme. The PSF module 1070 calculates the PSF from the pupil function G. The OTF module 1080 calculates the OTF from the PSF. The MSE module 1090 calculates $S_e$ and the Wiener filter-based MSE.

In FIG. 10, the various sampling schemes are determined by the user via user interface 1010. Using the example of FIG. 4, the user can set the L×K pupil sampling scheme, the N*×N* PSF sampling scheme and/or the 2p×p $S_e$ sampling scheme. There is an inherent tradeoff between accuracy and computation speed. Thus, the user may select coarser sampling during the initial design in order to iterate more quickly and then transition to denser sampling in order to fine tune the final design. In alternate embodiments, the sampling schemes may be adjusted automatically by the system, rather than the user.

Although the detailed description contains many specifics, these should not be construed as limiting the scope of the invention but merely as illustrating different examples and aspects of the invention. It should be appreciated that the scope of the invention includes other embodiments. Various other modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for designing an electro-optic imaging system for imaging a source, the electro-optic imaging system including an optical subsystem, a detector subsystem and a digital image processing subsystem, the method comprising:
modeling propagation of the source through the optical subsystem, the detector subsystem and the digital image processing subsystem, said modeling comprising:

calculating a pupil function G for the optical subsystem, the pupil function sampled on a non-rectangular grid;

calculating a post-processing performance metric that is a function of the modeled propagation, the performance metric accounting for a contrast capability of the optical subsystem and for noise from the detector subsystem and/or the digital image processing subsystem; and jointly designing the optical subsystem and the digital image processing subsystem based directly on the performance metric.

2. The method of claim 1 wherein calculating a pupil function for the optical subsystem comprises:

tracing rays through the optical subsystem, the rays sampling a pupil of the optical subsystem on the non-rectangular grid, wherein the pupil function is calculated from the traced rays.

3. The method of claim 2 wherein the rays sample the pupil of the optical subsystem on a polar grid.

4. The method of claim 2 wherein the rays sample the pupil of the optical subsystem on a linogram grid.

5. The method of claim 2 wherein the rays sample the pupil of the optical subsystem along radially extending arms, the rays distributed evenly with respect to distance along each arm.

6. The method of claim 2 wherein the rays sample the pupil of the optical subsystem along radially extending arms, the rays distributed evenly with respect to distance squared along each arm.

7. The method of claim 2 wherein fewer than 250 rays are traced for each sampling of the pupil, and the ray trace is sufficient to estimate a wavefront error function with an accuracy of better than $\lambda/10$.

8. The method of claim 2 wherein a sufficient number of rays are traced to estimate a wavefront error function with an accuracy of better than $\lambda/10$.

9. The method of claim 2 wherein calculating a pupil function for the optical subsystem further comprises:

calculating the pupil function sampled on a square grid, by interpolating from the non-rectangular grid to the square grid.

10. The method of claim 1 wherein modeling propagation of the source further comprises:

applying an nDFT to the pupil function to calculate a complex-amplitude point spread function U.

11. The method of claim 1 wherein modeling propagation of the source further comprises:

applying an nDFT to an intensity point spread function PSF to calculate an optical transfer function OTF.

12. The method of claim 1 wherein the post-processing performance metric is defined as an integral of an error metric that is a function of the modeled propagation and that accounts for a contrast capability of the optical subsystem and for noise from the detector subsystem and/or the digital image processing subsystem, and the integral is evaluated using a quadrature-type numerical integration.

13. The method of claim 1 wherein the post-processing performance metric is a Wiener filter-based mean square error (MSE).

14. The method of claim 13 wherein:

the steps of modeling propagation of the source through the optical subsystem, the detector subsystem and the digital image processing subsystem and calculating a post-processing performance metric consist essentially of:

tracing rays through the optical subsystem, the rays sampling a pupil of the optical subsystem on an L×K non-rectangular grid;

calculating a pupil function G sampled on an N×N square grid, based on the ray trace sampled on the non-rectangular grid, said calculating including interpolating from the non-rectangular grid to the square grid;

applying an nFFT to the pupil function G to calculate a complex-amplitude point spread function U sampled on an N*×N* square grid;

calculating an intensity point spread function PSF from the complex-amplitude point spread function U;

applying an nFFT to the intensity point spread function PSF to calculate an optical transfer function OTF sampled at nodes of a quadrature function;

calculating a digital image error spectral density $S_e$ from the optical transfer function OTF; and calculating the Wiener filter-based MSE by numerically integrating the digital image error spectral density $S_e$ using a quadrature-type numerical integration; and the step of jointly designing the optical subsystem and the digital image processing subsystem comprises:

iteratively designing the optical subsystem to minimize the Wiener filter-based MSE.

15. The method of claim 14 further comprising:

in response to user input, varying values of L, K, N and/or N* for different iterations.

16. The method of claim 14 further comprising:

automatically varying values of L, K, N and/or N* for different iterations.

17. The method of claim 14 further comprising:

increasing values of L, K, N and/or N* for later iterations.

18. A non-transitory computer readable storage medium containing instructions to cause a processor to design an optical subsystem of an electro-optic imaging system by executing the following steps:

modeling propagation of the source through the optical subsystem, the detector subsystem and the digital image processing subsystem, said modeling comprising:

calculating a pupil function for the optical subsystem, the pupil function sampled on a non-rectangular grid;

calculating a post-processing performance metric that is a function of the modeled propagation, the performance metric accounting for a contrast capability of the optical subsystem and for noise from the detector subsystem and/or the digital image processing subsystem; and jointly designing the optical subsystem and the digital image processing subsystem based directly on the performance metric.

19. The non-transitory computer readable storage medium of claim 18 wherein:

the post-processing performance metric is a Wiener filter-based mean square error (MSE);

the steps of modeling propagation of the source through the optical subsystem, the detector subsystem and the digital image processing subsystem and calculating a post-processing performance metric consist essentially of:

tracing rays through the optical subsystem, the rays sampling a pupil of the optical subsystem on an L×K non-rectangular grid;

calculating a pupil function G sampled on an N×N square grid, based on the ray trace sampled on the non-rectangular grid, said calculating including interpolating from the non-rectangular grid to the square grid;

applying an nFFT to the pupil function G to calculate a complex-amplitude point spread function U sampled on an N*×N* square grid;

calculating an intensity point spread function PSF from the complex-amplitude point spread function U;

applying an nFFT to the intensity point spread function PSF to calculate an optical transfer function OTF sampled at nodes of a quadrature function;

calculating a digital image error spectral density $S_e$ from the optical transfer function OTF; and calculating the Wiener filter-based MSE by numerically integrating the digital image error spectral density $S_e$ using a quadrature-type numerical integration; and the step of jointly designing the optical subsystem and the digital image processing subsystem comprises:

iteratively designing the optical subsystem to minimize the Wiener filter-based MSE.

20. The non-transitory computer readable storage medium of claim 19 wherein the step of iteratively designing the optical subsystem comprises:

varying values of L, K, N and/or N* for different iterations.

* * * * *